| United States Patent [19] | [11] Patent Number: 4,789,761 |
| Malone et al. | [45] Date of Patent: Dec. 6, 1988 |

[54] APPLIANCE TIMER

[75] Inventors: Charles F. Malone, Franklin; Larry M. Durham, Nashville, both of Tenn.

[73] Assignee: Scott Fetzer Company, Westlake, Ohio

[21] Appl. No.: 64,618

[22] Filed: Jun. 22, 1987

[51] Int. Cl.⁴ .............................................. H01H 7/08
[52] U.S. Cl. ................................. 200/38 C; 310/49 R; 310/83
[58] Field of Search ................. 200/38 R, 38 A, 38 F, 200/38 FA, 38 FB, 38 B, 38 BA, 38 C, 38 CA, 38 D, 38 DA, 38 DB, 38 DC, 38 E; 310/49 R, 83, 263, 156

[56] References Cited

U.S. PATENT DOCUMENTS

| 2,317,187 | 4/1943 | Griffiths | 310/156 |
| 3,452,228 | 6/1969 | Woolley | 310/263 X |
| 4,079,636 | 3/1978 | Altenschulte | 200/38 FB |

Primary Examiner—A. D. Pellinen
Assistant Examiner—Morris Ginsburg
Attorney, Agent, or Firm—Pearne, Gordon, McCoy & Granger

[57] ABSTRACT

A motor assembly having a field plate and a gear train mounted on at least one face of the field plate. The field plate defines an aperture which, in turn, defines a plurality of field poles for a rotor mounted in the aperture. A field coil is wound about a portion of the field plate to provide a motor for the field-plate-mounted gear train.

13 Claims, 2 Drawing Sheets

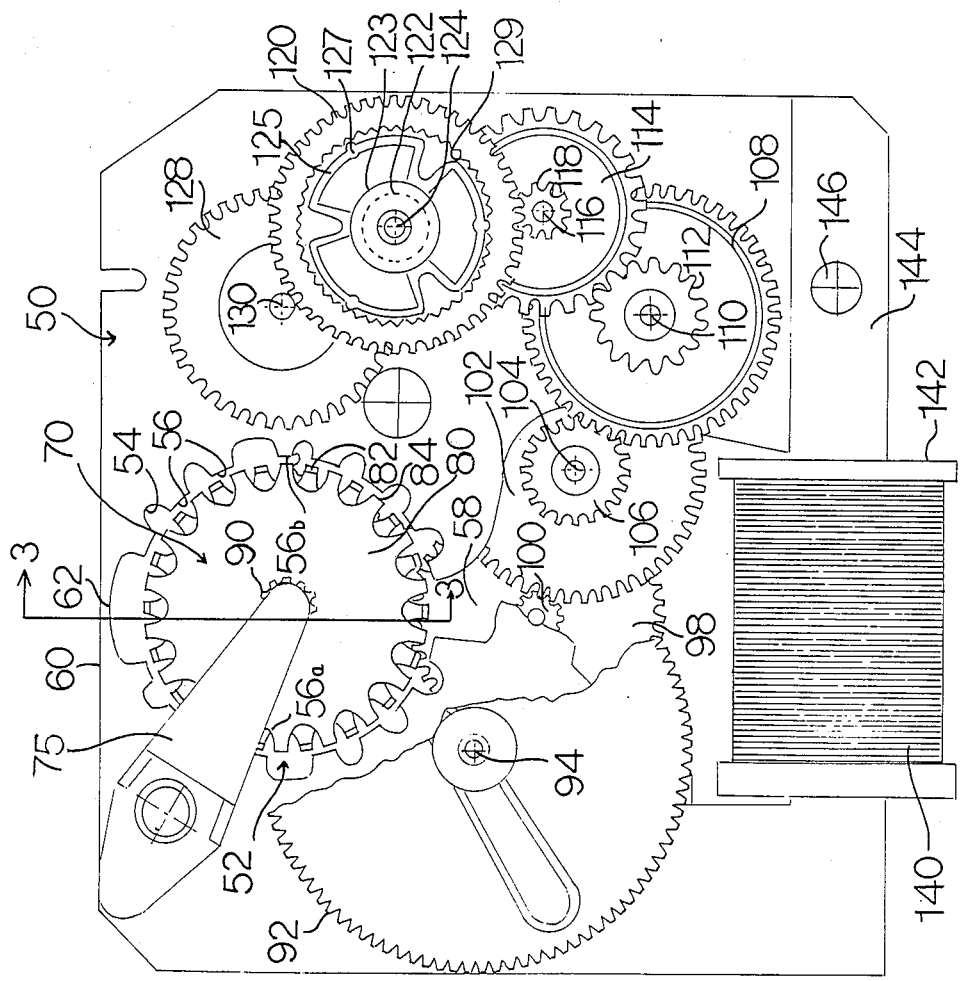

4,789,761

APPLIANCE TIMER

BACKGROUND OF THE INVENTION

This invention relates to appliance timers and, particularly, to an appliance timer having a timing cam which operates a series of switches for operating circuits controlled by the timer. The timer includes an improved motor assembly for driving the timing cam which greatly reduces the size of the timer assembly and its complexity.

Although the principles of the present invention may be included in various timers, a particular application is made in timers of the type employed to control the various circuits and functions of automatic laundry appliances, such as washers and dryers. Appliance timers basically comprise a rotatable member having a plurality of projecting cams which sequentially engage switch members which, in turn, control the various operations of the appliance.

Basically, there are two types of timers for home appliances. One such time is a cylindrical rotary drum having a plurality of cams projecting from its surface which engage switch members and is quite similar to a music box. A principal disadvantage of such a timer is that it is bulky and it is difficult to mount the timer in the space requirements dictated by the appliance manufacturer. Another timer is set forth in U.S. Pat. No. 2,703,347 to A. R. Constantine, issued Mar. 1, 1975. According to that patent, the appliance timer comprises a flat disc mounted in a housing and having ratchet teeth on its periphery. The disc is driven incrementally about a central shaft by a pawl, which in turn is driven in a reciprocal manner by a synchronous motor. At least one face of the disc is provided with arcuate cam surfaces which are concentrically arranged about the face or faces of the disc. Switch members are arranged about the faces of the housing to engage the arcuate cam members upon rotation of the disc. Electrical connectors cooperate with the switch members to control the various cycles of the appliance.

In a timer having a rotary drum type cam, the synchronous motor is generally located in the timer housing so that its output shaft is parallel to the cam drum and has a gear train between its output shaft and the drum cam which comprises a speed reduction gear train to drive the drum at a very low rotational speed. This arrangement results in a construction wherein the length of the timer housing is at least equal to the diameter of the drum cam and the diameter of the synchronous motor. The depth of the housing is generally dictated by the axial extent of the drum cam.

While the depth of the timer housing according to the above-mentioned Constantine patent is considerably reduced because of the disc cam arrangement, the length and width of the housing are increased to accommodate the switches, the synchronous motor, and the pawl drive mechanism.

A further disadvantage of the prior art timers is that they are extremely difficult to service and reassemble by relatively unskilled repair personnel.

SUMMARY OF THE INVENTION

This invention overcomes many of the prior art problems and provides a timer having greatly reduced housing dimensions while providing all of the mechanical and electrical functions of prior art timers.

More specifically, this application provides an appliance timer having a cup-shaped housing which closely envelops a rotary drum cam and projects slightly beyond one end of the cam. A series of switches are mounted through the wall of the cup-shaped housing so that cantilevered ends of those switches are adapted to follow a plurality of tracks provided on the drum cam to make and break circuits upon rotation of the drum cam. A shallow cup-shaped housing closes the open end of the cup-shaped housing to effectively seal the cam and switches against the entry of foreign particles such as dirt and lint. The shallow housing includes an aperture which permits the drive shaft of the cam drum to project therethrough. A projecting end of the drive shaft for the drum cam is mounted in a field plate which telescopes into the shallow cup-shaped housing and, in cooperation with the shallow cup-shaped housing, mounts a plurality of gears which comprise a gear reduction drive train from the output of a synchronous motor to the cam drum. The synchronous motor comprises the aforementioned field plate which has an aperture therethrough defining a plurality of salient field poles. A permanently magnetic disc rotor is mounted for rotation within the aperture and has an axially projecting drive shaft to drive the gear train.

Thus, the assembly according to this invention includes a motor having a component (the field plate) which constitutes part of the housing and which services to mount the drive train to the main program cam, thus greatly reducing the depth of the appliance timer housing.

As was alluded to above, the principles of the invention are described herein as applied to an appliance timing mechanism. It will become apparent to those skilled in the art that the reduction in depth of the housing provides a feature which is ideally suited for other mechanisms, such as electrical clocks and other timing devices.

BRIEF DESCRIPTION OF THE DRAWINGS

FIG. 2 is an elevational view of the drive mechanism for the program cam, with certain portions broken away to show details of construction, the plane of the view being indicated by the line 2—2 in FIG. 1; and FIG. 3 is a cross-sectional view, the plane of the view being indicated by the line 3—3 in FIG. 2.

DETAILED DESCRIPTION OF THE INVENTION

Figure 1:
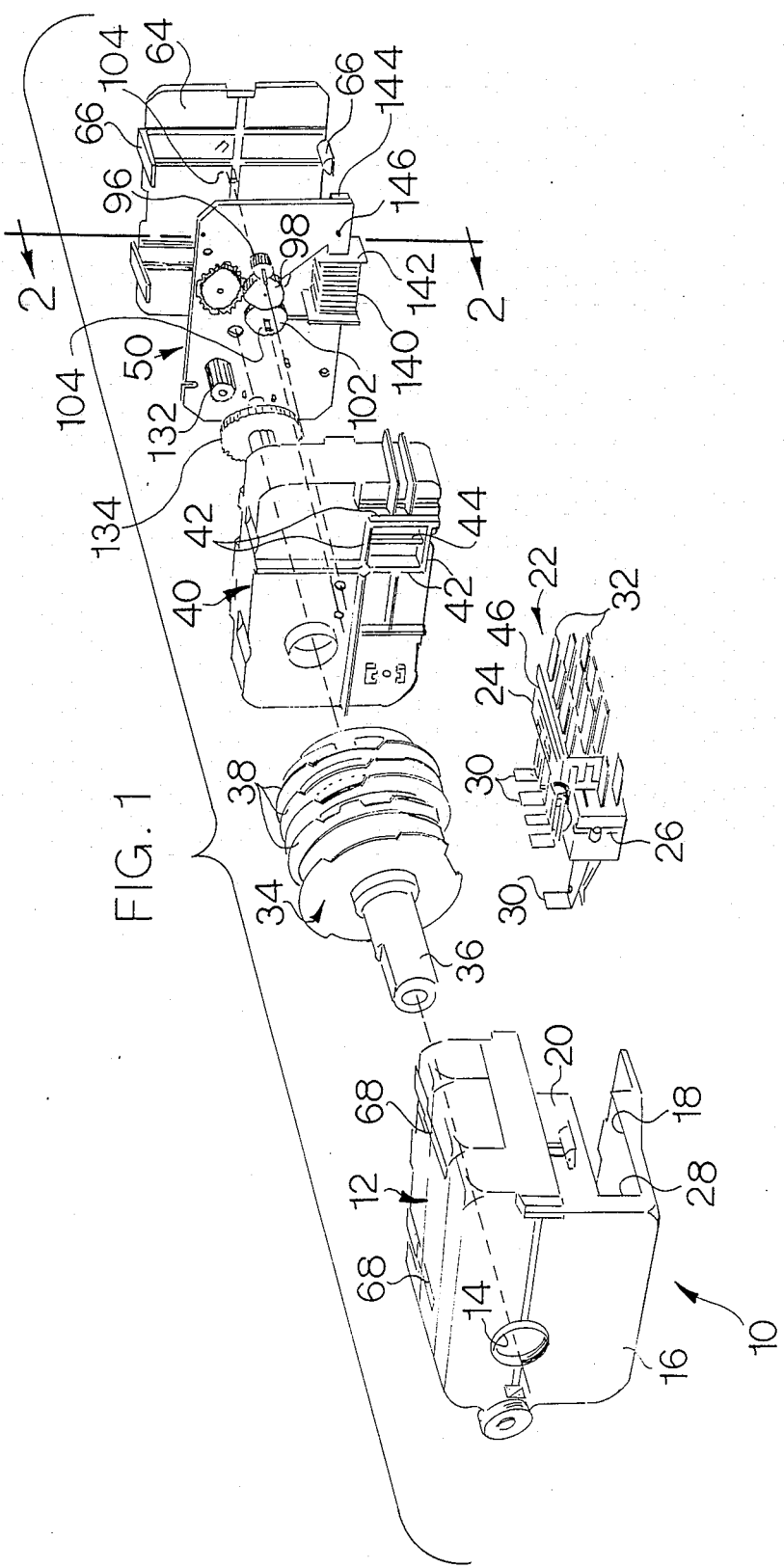
FIG. 1 is an exploded, perspective view of an appliance timer according to this invention.

Referring now to the drawings, there is illustrated a sequential timer 10 for appliances such as dishwashers, clothes washers, clothes dryers, and the like, which includes a cup-shaped housing 12. The housing 12 has an aperture 14 in a wall 16 and a rectangular slot 18 in one of its side walls 20.

A switch assembly 22 comprising a switch arm connector block 24 is mounted in the slot 18 by means of a groove 26 which interlocks with an end wall 28 of the slot 18. The switch arm connector block is preferbly the type shown in U.S. Pat. No. 4,517,426, and includes a plurality of spring switchblades 30 and a plurality of quick disconnect connector blades 32.

The switchblades 30 cooperate with a drumtype timing cam 34 which has an axially projecting operating shaft 36 projecting through the aperture 14. The timing cam 34 has a plurality of cam tracks 38 on its cylindrical surface which together define a timing program and which sequentially operate the switchblades 30 in the programmed manner.

The cam 34 and the switch assembly 22 are sealed in the cup-shaped housing 12 by a cup-shaped wall member 40 which is telescoped into the open mouth of the housing 12 to effectively seal the cam 34 and the switch assembly 22 therein and to close the slot 18. Rectangle-defining ribs 42 on the member 40 surround one end of the assmebly 22 and a cross rib 44 engages a groove 46 in the assembly 22.

Received in the open mouth of the cup-shaped wall member 40 is a field plate 50 which is shown in greater detail in FIG. 2. Referring principally to FIG. 2, it may be seen that the field plate 50 comprises a thin metallic plate having a circular aperture 52 defined by a plurality of notches 54 and projections which define salient poles 56. It may be noted that the poles 56 are generally arranged in a uniform fashion about the periphery of the aperture 52, but that a pair of diametrically opposed poles 56a and 56b are offset and are narrower than the remaining poles. These poles 56a and 56b are so-called "starting poles" since they provide the asymmetric field colnditions for starting purposes, as is well known in the art. It may be noted that the field plate 50 is split to provide an air gap 58, and it may be further noted that the aperture 52 and an edge 60 of the field plate 50 define a thinned neck portion 62 which essentially provides a second diametrically opposed air gap, since the thinned portion 62 would be effectively saturated with flux due to the relatively large surrounding areas.

The timer assembly is closed by an end cover 64 which has spring tabs 66 which snap into cooperating grooves 68 in the housing 12.

A permanently magnetic rotor assembly 70 is rotatably mounted within the aperture 52. As may be seen with additional reference to FIG. 3, the rotor 70 is carried on a pin 72, and one end of the pin is mounted in a bearing arm 75 which is fixed to the field plate 50 and the other end of the pin 72 is mounted in the wall member 40. The total thickness of the rotor 70 is such that it does not substantially exceed the thickness of the field plate 50.

The rotor 70 includes a hub 74 of non-magnetic material, such as a rigid plastic. The rotor 70 further includes a permanent magnet 76 which is sandwiched between a pair of magnetic pole plates 78 and 80. Each of the pole plates 78 and 80 is provided with a set of pole elements 82 and 84, respectively, which extend parallel to the axis of rotation and which are interfitted with each other. In this embodiment, the pole plates 78 and 80 are identical to each other, and the pole elements 82 and 84 are disposed uniformly about the axis of rotation. Each of the pole elements 82 is interfitted centrally in the space between two of the pole elements 84. All of the pole elements 82 and 84 are of the same size and are uniformly distributed about the rotational axis. In this embodiment, the south magnetic field polarity is induced in the pole plate 78, and hence in the pole elements 82, while the north magnetic polarity is induced in the pole plate 80, and hence in the elements 84. Thus, the pole elements 82 and 84 are of opposite magnetic polarity.

There is provided a speed reducing gear train between the rotor and the shaft 36 of the drum cam 34. Thus, the rotor 70 carries a gear 90 which meshes with a gear 92 mounted on a shaft 94 extending between the field plate 50 and the cover 64. The gear 92 carries a smaller pinion gear 96 (FIG. 1) which engages a gear 98. The gear 98 is mounted between the field plate 50 and the wall member 40, and carries a gear 100 which engages a gear 102. The gear 102 is mounted on a pin 104 which extends between the end cover 64 and the wall member 40, and carries a gear 106. The gear 106 meshes with a gear 108, which is mounted on a pin 110 extending between the field plate 50 and the end cover 64, and carries a gear 112. The gear 112, in turn, meshes with a gear 114, which is mounted on a pin 116 extending between the field plate 50 and the end cover 64, and carries a gear 118. The gear 118 meshes with a bidirectional clutch-type gear 120, which is more fully described in U.S. Pat. No. 4,702,122. The bidirectional gear 120 carries a pinion gear 122, which is connected to a hub 123 and is adapted to slip relative to the gear 120 upon the application of a sudden torque load, and which will permit the gear 122 to move in a direction opposite to its driven direction if opposite loads are imposed upon the gear 120. The hub 123 is held in normal driving engagement with the gear 120 by a plurality of rosette-shaped springs 125 which are integrally molded with the hub and the pinion gear and which carry a plurality of lobes 127. The lobes 127 are biased into contact with a multiplicity of ratchet teeth 129 by the springs 125 and permit relative movement of the gear 120 relative to its hub 123 and the pinion gear 122 upon the application of a sudden torque load. The gear 122 and its hub 123 are mounted on pin 124, which extends between the field plate 50 and the end cover 64, and drives a gear 128 mounted on a shaft 130, which extends between the field plate 50 and the end cover 64. The gear 128 carries a gear 132 (FIG. 1), which meshes with a gear 134 fixed to the camshaft 36. Thus, it may be seen that the gears 90, 92, 106, 108, 112, 114, 118, 120, 122, and 128 are positioned on one side of the field plate 50, while the gears 96, 98, 100, 102, and 134 are positioned on the other side of the field plate 50. The gears in the speed reducing gear train may be molded from a suitable thermoplastic.

A motor field winding 140 is carried by a bobbin 142 which is mounted on an arm 144 of the field plate 50. The arm 144 is initially spaced from the remainder of the field plate 50 and, after the bobbin 142 is inserted on the arm 144, the arm 144 is spotwelded or brazed to the field plate 50 by a spot weld 146.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A motor assembly comprising a substantially planar field plate having means defining a first aperture therethrough and defining a plurality of salient field poles, a permanently magnetic disc rotor mounted for rotation within said aperture, said rotor having an axially projecting drive shaft, first gear means mounted on said rotor, second gear means rotatably mounted on said field plate and being in driving engagement with said first gear means.

2. A motor assembly according to claim 1, including a field winding wrapped about a portion of said field plate.

3. A motor assembly according to claim 2, wherein said portion is defined by an edge of said plate and a second aperture defining means in said plate.

4. A motor assembly according to claim 1, wherein said second gear means includes a gear train comprising at least two gears.

5. A motor assembly according to claim 4, wherein said gear train is a speed reducing train.

6. A motor assembly according to claim 4, wherein at least one of said gears is mounted on one face of said field plate and the remaining gears are located on the other face of said field plate.

7. A motor assembly according to claim 1 including a timer and switch assembly, wherein said second gear means is in driving engagement with a sequencing cam rotatably supported in a housing, said sequencing cam having a series of cam tracks arranged in its direction of rotation, a series of switches in said housing adapted to open and close a plurality of circuits in a predetermined sequence, each of said switches including a movable cam follower biased against said cam tracks.

8. A sequential timer for controlling circuits of an electrical appliance comprising, in combination:
   (a) a sequencing cam having a plurality of tracks jointly defining a timing program;
   (b) a series of switches for connection in said circuits and controlled by said tracks;
   (c) a housing enclosing said sequencing cam and switches;
   (d) a motor for driving said sequencing cam; and
   (e) gear means drivingly connecting said sequencing cam and said motor;
   said motor having a field plate consisting of a portion of said housing.

9. A sequential timer for controlling circuits of an electrical appliance according to claim 8, including a field winding wrapped about a portion of said field plate.

10. A sequential timer for controlling circuits of an electrical appliance according to claim 9, wherein said portion is defined by an edge of said plate and an aperture defining means in said plate.

11. A sequential timer for controlling circuits of an electrical appliance according to claim 8, wherein said gear means includes a gear train comprising at least two gears.

12. A sequential timer for controlling circuits of an electrical appliance according to claim 11, wherein said gear train is a speed reducing train.

13. A sequential timer for controlling circuits of an electrical appliance according to claim 11, wherein at least one of said gears is mounted on one face of said field plate and the remaining gears are located on another face of said field plate.

* * * * *